Figure 1:
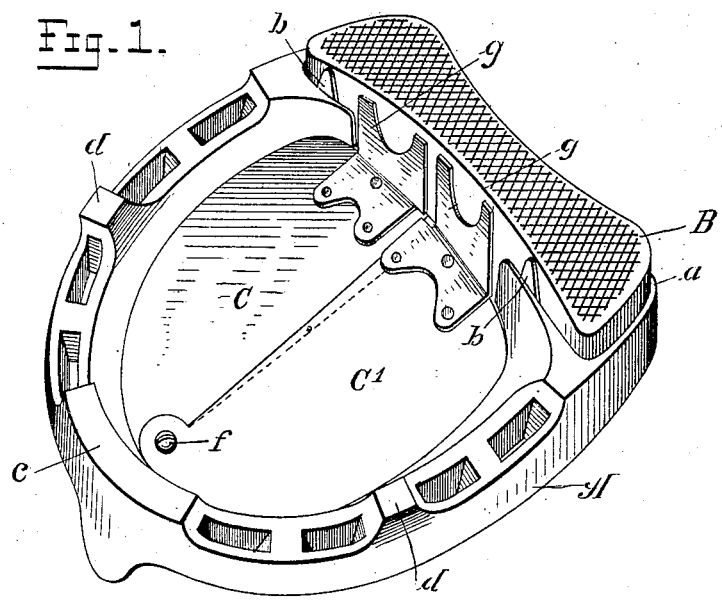
Figure 2:
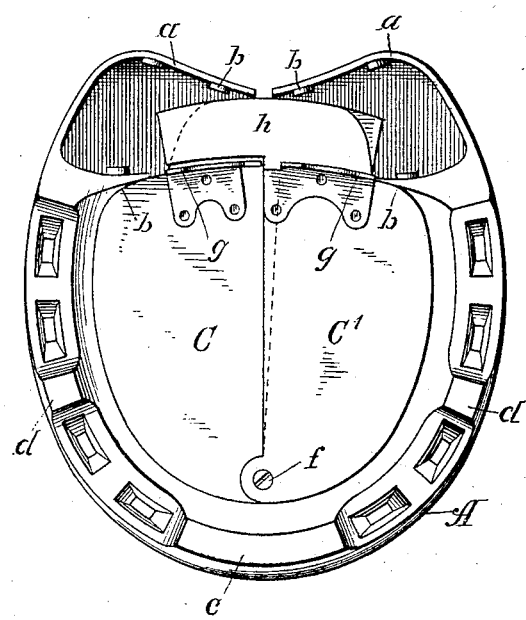
Figure 3:
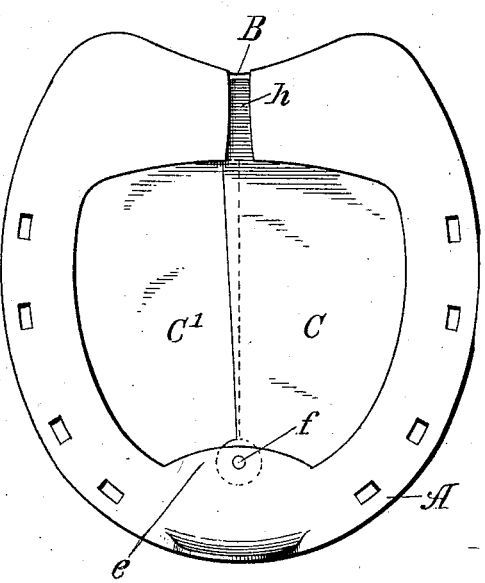

No. 865,507.  
M. A. LIEBERT.  
HORSESHOE.  
APPLICATION FILED JUNE 22, 1907.  
PATENTED SEPT. 10, 1907.

Witnesses:  
G. V. Rasmussen  
John A. Kehlenbeck

Inventor  
Morris A. Liebert  
By his Attorneys  
Briesen & Knauth

UNITED STATES PATENT OFFICE.

MORRIS A. LIEBERT, OF NEW YORK, N. Y.

HORSESHOE.

No. 865,507.　　　　Specification of Letters Patent.　　　　Patented Sept. 10, 1907.

Application filed June 22, 1907. Serial No. 380,192.

*To all whom it may concern:*

Be it known that I, MORRIS A. LIEBERT, a citizen of the United States, residing at Bay Ridge, borough of Brooklyn, county of Kings, city and State of New York, have invented a new and useful Improvement in Horseshoes, of which the following is a specification.

The invention relates to hoof-pads adapted to shield the frog of a horse's foot from nails, stones, and other sharp objects.

It consists in the matters hereinafter described, and more particularly set forth in the claims.

In the drawings, Figure I is an inverted perspective view of a horseshoe provided with the hoof pad constructed in accordance with my invention. Fig. II is a bottom plan view of the horseshoe shown in Fig. I with the elastic cushion removed. Fig. III is a top plan view of the horseshoe shown in Fig. I.

As shown in the drawings A designates a horseshoe provided at its heels with two bar-portions $a$, $a$, each provided with a plurality of retaining lugs, $b$, $b$ cast upon the inner side walls of the bar portions. The toe calk is shown at $c$, and side calks are shown at $d$ $d$. Above the front calk the horseshoe is provided with a rearwardly projecting plate $e$, (Fig. III), the purpose of which will hereafter appear. A cushion B of rubber or other elastic material is adapted to be inserted into the bar portions $a$ $a$.

The hoof-pad consists of two plate members, C, C', made of sheet metal or other suitable material, which are hinged together at their front ends by means of a screw $f$ extending through overlapping parts of said members, which screw is held in a screw threaded aperture in the projecting plate $e$. As shown, the members overlap at their inner side edges, so that they may be swung on the screw as a pivot in either direction in their planes. Each member is provided with lugs $g$ $g$, which, as will hereafter be shown, coöperate with the lugs $b$ to hold in place the cushion B. Each member is also provided with a retaining piece $h$, each extending substantially at right angles to the inner edge of the corresponding member. These retaining pieces overlap one another, the retaining piece of member C' being so arranged as to swing freely behind the lugs $g$ on member C. If desired, the innermost lug on member C may be undercut so as to admit a portion of member C' when the members are swung inwardly towards one another.

My device is applied to the hoof in the following manner: The horseshoe A is properly adjusted to the hoof, and nailed into place, the adjustment being facilitated by the fact that the rear bar portion is made in two parts, thus permitting the shoe to be spread or contracted. The hoof pad members C, C', are then attached to the shoe by means of the screw $f$; each member is then swung outwardly so that its outer edge contacts with the inner edge of the shoe. The retaining pieces $h$, $h$, will overlap one another, and will bridge the open space between the bar portions $a$, $a$. The rubber cushion B is then trimmed to fit between the retaining lugs, $b$ $b$, $g$ $g$, and is pushed down upon the bar portions $a$ $a$ and the overlapping extensions $h$ $h$. It will be noticed that the retaining lugs, $b$ $b$, are cast upon the inner sides of the bar portions; this construction enables the cushion to be snugly held by the lugs while having ample space for lateral expansion, thus enabling the cushion readily to give when the weight is on the shoe, and to recover when the weight is removed. If the cushion is always able to give under the weight, it will suffer much less from wear than if it were snugly held between the sides of the bar portion. The retaining lugs $b$ $b$, $g$ $g$, are then bent over with the aid of a hammer against the cushion so as to hold the cushion firmly in place. The cushion, thus secured, will hold the extensions $h$ $h$ in place and thus prevent any motion on the part of the hoof pad members, particularly after the cushion has been firmly pressed into place by the weight of the horse.

In my construction the pad is attached to the lower side of the shoe and thus is further away from the tender portion of the foot, so that if the pad should be bent by striking a stone, the bent portion is not so liable to come into contact with such tender portion.

My device is readily removed from the shoe, even when bent, and has no complicated parts liable to get out of order. The retaining pieces, $h$ $h$, bridging the gap between the bar portions $a$ $a$, afford additional protection and support to the cushion and form, with the bar portions, practically a solid bar, with all the advantages of such a bar, while preserving the advantages of an adjustable split bar. It is well known that the heels of a horse's foot are more tender and liable to disease than any other part of the foot, and that it is of advantage to support some of the weight of the animal on the frog, so as to take it off the heels. The solid bar structure permits the frog to carry a portion of the weight.

Changes in the structural details of the horseshoe and hoof pad may be made without departing from the spirit of my invention.

I claim:

1. In combination with a horseshoe, a hoof pad adapted to be attached to the lower front portion of the horseshoe, a cushion adapted to be attached to the lower rear portion of the horseshoe, a retaining piece extending from the rear of said hoof pad adapted to be held in place between the cushion and the horseshoe, and projections on the rear of the horseshoe adapted to hold said cushion in place, substantially as and for the purpose described.

2. A hoof pad comprising two lateral plate members hinged at their front ends by means of a screw extending through overlapping portions of such members, in combination with an extension $e$ on the horseshoe provided with an aperture adapted to receive said screw from the lower side thereof, and means for attaching the rear portion of the hoof pad to the lower rear portion of the horseshoe, substantially as and for the purpose described.

3. The combination, with a horseshoe, of a hoof pad comprising two lateral plate members hinged at their front ends to swing toward and from each other in their planes, means for removably attaching the same to the front portion of the horseshoe, a cushion adapted to be held in place at the lower rear portion of the horseshoe, means for so holding the cushion in place, and a retaining piece on each of said hoof pad members, adapted to be held in place between the cushion and the horseshoe, substantially as and for the purpose described.

4. In combination with a horseshoe, a hoof pad comprising two lateral plate members hinged at their front ends to swing toward and from each other in their planes, means for removably attaching the same to the front portion of the horseshoe, a cushion adapted to be held in place on the lower rear portion of the horseshoe, a retaining piece on each of such hoof pad members adapted to be held in place between the cushion and the horseshoe, and projection on the horseshoe and on the rear portions of the hoof pad members to hold the cushion in place, substantially as and for the purpose described.

5. In combination with a horseshoe provided with bar portions $a$, $a$, a hoof pad comprising two lateral plate members hinged at their front ends to swing toward and from each other in their planes, means for removably attaching the same to the front portions of the horseshoe a cushion adapted to be held in place upon the lower side of the bar portions, means for so holding the cushion in place and a retaining piece on each of such hoof pad members adapted to overlap one another and to bridge the space between the bar portions and to be held in place between the bar portions and the cushion, substantially as and for the purpose described.

6. The combination with a horseshoe, of a hoof-pad comprising two lateral plate members C C', hinged at their front ends by means of a screw held by a projecting plate $e$ in the horseshoe, bar-portions $a$ $a$ attached to the rear of the horseshoe, a cushion B adapted to be held in place upon the bar portions, retaining pieces $h$ $h$ projecting from the rear of the plate members and adapted to lie upon the bar-portions and to be held in place between them and the cushion, and lugs $g$ $g$ upon the plate member adapted to coöperate with lugs $b$ $b$ on the bar portions to hold the cushion in place, the lugs $b$ $b$ being cast upon the inner sides of the bar-portions so as to permit a sidewise expansion of the cushion, substantially as and for the purpose described.

7. In combination with a horseshoe, the rear bar-portions $a$ $a$, a cushion B adapted to be held in place upon said bar portions, and lugs $b$ $b$ cast upon the inner sides of the bar portions to permit a sidewise expansion of the cushion, substantially as and for the purpose described.

In witness whereof I have hereunto set my hand this 19th day of June, 1907.

MORRIS A. LIEBERT.

Witnesses:
 FRITZ V. BRIESEN,
 MAX SCHODSKY.